(12) United States Patent
Wuu et al.

(10) Patent No.: US 11,710,296 B2
(45) Date of Patent: Jul. 25, 2023

(54) END-TO-END VEHICLE PERCEPTION SYSTEM TRAINING

(71) Applicant: Zoox, Inc., Foster City, CA (US)

(72) Inventors: Cheng-Hsin Wuu, Pittsburgh, PA (US); Subhasis Das, Menlo Park, CA (US); Po-Jen Lai, Mountain View, CA (US); Qian Song, San Mateo, CA (US); Benjamin Isaac Zwiebel, Burlingame, CA (US)

(73) Assignee: Zoox, Inc., Foster City, CA (US)

( * ) Notice: Subject to any disclaimer, the term of this patent is extended or adjusted under 35 U.S.C. 154(b) by 27 days.

(21) Appl. No.: 17/542,354

(22) Filed: Dec. 3, 2021

(65) Prior Publication Data

US 2023/0177804 A1 Jun. 8, 2023

(51) Int. Cl.
*G06V 10/70* (2022.01)
*G06V 20/58* (2022.01)
*G06V 20/40* (2022.01)
*G06V 20/56* (2022.01)

(52) U.S. Cl.
CPC .............. *G06V 10/70* (2022.01); *G06V 20/41* (2022.01); *G06V 20/582* (2022.01); *G06V 20/584* (2022.01); *G06V 20/588* (2022.01)

(58) Field of Classification Search
CPC ............. G06T 7/70; G06T 2207/30256; G06T 2207/20084; G06T 2207/30244; G06T 2207/30252; G06T 7/74; G01C 21/265; G01C 21/3837; G01C 21/30; G01C 21/3889; G06K 9/6267; G06V 20/584; G06V 20/588; G06V 20/58; G06V 20/582; B60W 2552/53; B60W 60/001
See application file for complete search history.

(56) References Cited

U.S. PATENT DOCUMENTS

| | | | | |
|---|---|---|---|---|
| 11,157,527 B2* | 10/2021 | Wang | ......................... | G06T 7/11 |
| 11,195,418 B1* | 12/2021 | Hong | ...................... | G08G 1/166 |
| 2020/0133272 A1* | 4/2020 | Chong | ................. | G05D 1/0088 |
| 2022/0189054 A1* | 6/2022 | Kaiser | .................. | G06V 20/582 |

\* cited by examiner

*Primary Examiner* — Md K Talukder
(74) *Attorney, Agent, or Firm* — Lee & Hayes, P.C.

(57) ABSTRACT

Techniques for a perception system of a vehicle that can detect and track objects in an environment are described herein. The perception system may include a machine-learned model that includes one or more different portions, such as different components, subprocesses, or the like. In some instances, the techniques may include training the machine-learned model end-to-end such that outputs of a first portion of the machine-learned model are tailored for use as inputs to another portion of the machine-learned model. Additionally, or alternatively, the perception system described herein may utilize temporal data to track objects in the environment of the vehicle and associate tracking data with specific objects in the environment detected by the machine-learned model. That is, the architecture of the machine-learned model may include both a detection portion and a tracking portion in the same loop.

20 Claims, 6 Drawing Sheets

END-TO-END VEHICLE PERCEPTION SYSTEM TRAINING

BACKGROUND

Autonomous vehicles utilize various systems, methods, and apparatuses to traverse an environment. For instance, autonomous vehicles can utilize one or more machine-learned models to navigate through environments where vehicles, people, buildings, and other objects may be present. In many cases, autonomous vehicles will utilize specific machine-learned models for specific tasks and operations. Additionally, an output from one machine-learned model of an autonomous vehicle can be used as an input to another machine-learned model of the autonomous vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
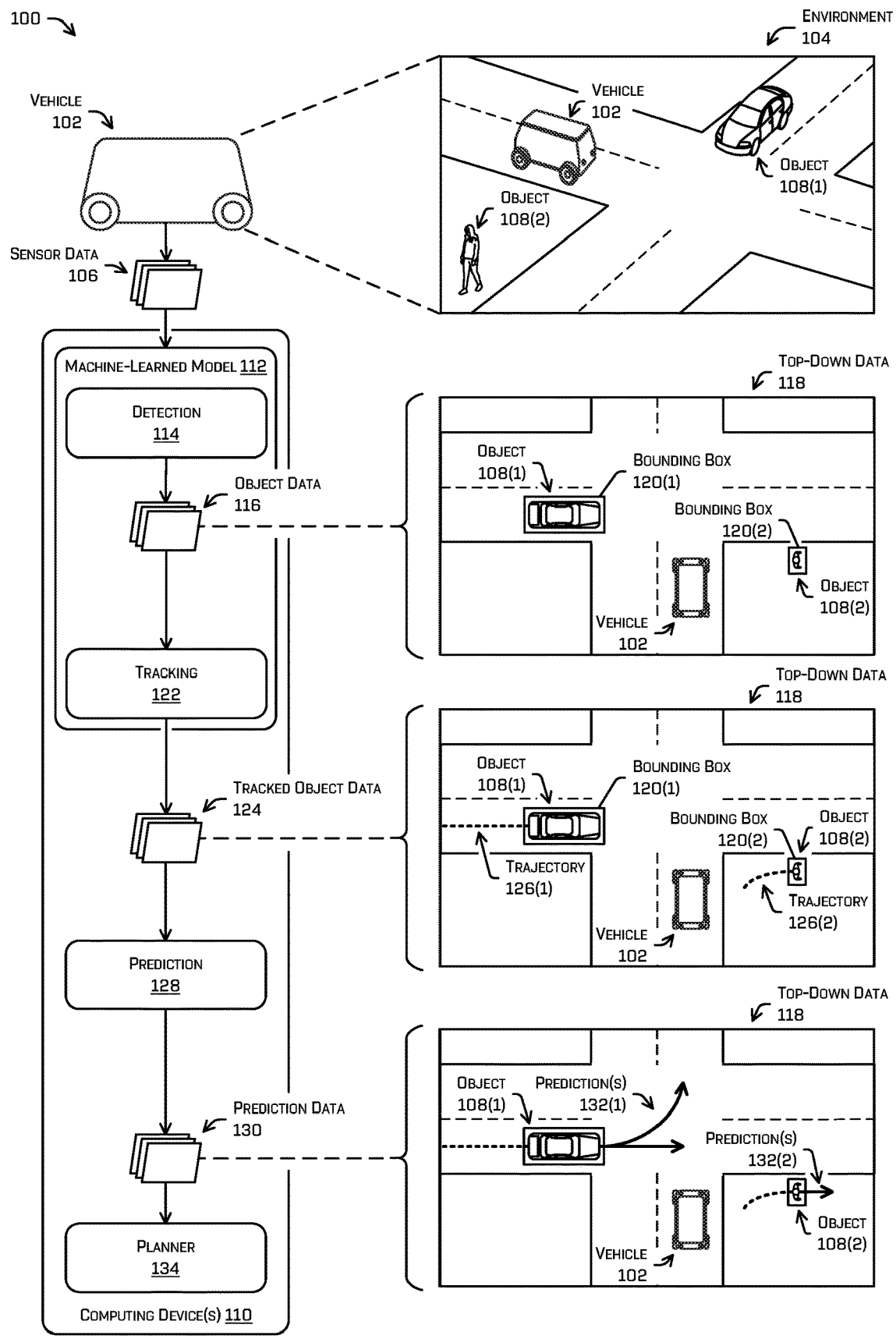
FIG. 1 is a pictorial flow diagram illustrating an example process according to the techniques described herein for using a machine-learned model to determine tracked object data.

This disclosure is directed to, among other things, techniques for improving a perception system of a vehicle by training a first portion (e.g., first machine-learned model, first component, etc.) of the perception system at least partially with outputs of a second portion (e.g., second machine-learned model, second component, etc.) of the perception system, such that outputs of the first portion are tailored for use as inputs for the second portion. In other words, rather than training each portion of the perception system individually, this disclosure describes techniques in which the different portions of the perception system are trained together. By training the perception system end-to-end (e.g., training the first portion based on outputs of the second portion, or otherwise training separate portions together) and including temporal information in the inputs, the outputs of the first portion can be tailored for use as inputs to the second portion, resulting in improved accuracy and confidence for outputs of the perception system as a whole.

Additionally, this application is directed to an improved architecture of a vehicle perception system that utilizes temporal data to track objects in the environment of the vehicle and associate tracking data with specific objects in the environment. That is, rather than training a first machine-learned model of the perception system to detect an object and, separately, training a second machine-learned model of the perception system to track the object, the architecture of the perception system is configured to output tracked object data based on input sensor data. That is, the perception system may include the first portion and the second portion that, together, output tracked object data based on input sensor data.

For instance, the perception system (e.g., a machine-learned model) may be configured such that, in a first operation, object data is determined for an object detected in the environment, the object data indicating a current location of the object. In a second operation, the perception system may determine an estimated current location of the object based on stored tracking data associated with the object. In a third operation, the perception system may associate, as tracked object data, the object data with the stored tracking data based at least in part on the current location being within a threshold distance of the estimated current location. The perception system may then output the tracked object data, which may then be used by other components and/or systems of the vehicle to, among other things, make predictions about the detected objects, determine a trajectory for the vehicle to traverse through the environment, or the like.

By way of example and not limitation, a method according to the various technologies described in this disclosure may include techniques of receiving sensor data representing an environment in which a vehicle is operating. In some examples, the vehicle may include one or more sensors, such as image sensors (e.g., cameras), lidar sensors, radar sensors, time of flight sensors, environmental sensors, or the like. As such, the sensor data representing the environment may include image data, lidar data, radar data, time of flight data, or the like. Additionally, in some instances the sensor data may be associated with a first instance of time, such as a current time, which may be referred to herein as "$t_0$."

In some examples, the sensor data may be input into a machine-learned model that is configured for use in the vehicle. In some instances, the machine-learned model may be part of a perception system of the vehicle that is configured to detect objects, track the detected objects, and/or make certain predictions about the detected and/or tracked objects. In some examples, the perception system may include one or more machine-learned models. Additionally, or alternatively, the perception system may include a single machine-learned model that includes multiple stages, sub-process, or components. That is, the single machine-learned model may be configured to determine a single output for a single input, even though different stages of the machine-learned model may determine intermediate outputs.

In various examples, the machine-learned model may include an object detection portion (e.g., a first stage, subprocess, component, etc.) that is trained to generate or otherwise determine object data associated with one or more objects detected in the environment. That is, the object detection portion of the machine-learned model may analyze or process the sensor data using one or more algorithms in order to detect a presence of the objects in the environment and/or determine the object data associated with the objects. In some examples, the object data may include one or more bounding boxes associated with respective objects in the environment. A respective bounding box may be indicative of information associated with a specific object at the first instance of time ($t_0$) in which the sensor data was generated/captured. For instance, a bounding box may indicate, among other things, a location of an object in the environment at $t_0$, an orientation of the object at $t_0$, a size of the object, or the like. Additionally, or alternatively, the object data may indicate a classification and/or type of the object, such as whether the object is a dynamic object that is capable of movement (e.g., a vehicle, motorcycle, bicycle, pedestrian, animal, etc.) and/or a static object (e.g., a building, road surface, tree, sign, barrier, curb, parked vehicle, etc.). Additionally, or alternatively, the object data may indicate other information associated with the object, such as a velocity of the object at $t_0$, a confidence associated with the object, or the like.

In some examples, the machine-learned model may include an object tracking portion. In some examples, the object tracking portion may be configured to perform multiple subprocesses to determine trajectories traversed by the detected objects during a period of time from $t_{0-N}$-$t_0$, where "N" represents any integer greater than or equal to one. For instance, the object tracking portion may include, among other things, a location estimation subprocess, a track-location association subprocess, a trajectory estimation subprocess, and/or a track storage subprocess. In examples, the object tracking portion may receive, as inputs, the object data determined by the object detection portion, as well as stored trajectory data indicating trajectories traversed by objects during a period of time from $t_{0-N}$-$t_{0-1}$, and output tracked object data as described herein.

In some examples, the machine-learned model may, during the location estimation subprocess, determine an estimated location of the object in the environment at the time $t_0$. Additionally, or alternatively, the machine-learned model may determine an estimated orientation of the object, an estimated size of the object, an estimated classification of the object, or the like, as well as any other feature that may be indicated within the object data. In examples, the machine-learned model determines the estimated location of the object at $t_0$ based at least in part on stored tracking data associated with the object. The stored tracking data may indicate a trajectory traversed by the object during a past period of time from $t_{0-N}$-$t_{0-1}$ (e.g., a period of time that ends moments before the current instance of time at $t_0$). For instance, the stored tracking data may include multiple frames of sensor data, tracking data, tracked object data, etc., where each individual frame is associated with a different instance of time (e.g., $t_{0-1}$, $t_{0-2}$, $t_{0-3}$, $t_{0-4}$, $t_{0-5}$, and so forth). In some examples, a period of time (e.g., 100 milliseconds, 200 milliseconds, 500 milliseconds, etc.) may separate each instance of time. Using the frames of stored tracking data, the machine-learned model may determine the estimated location of the object at the current instance of time $t_0$. In some examples, the machine-learned model determines multiple estimated locations of different objects in the environment.

In some examples, the machine-learned model may, during the track-location association subprocess, associate specific object data with specific tracking data based at least in part on a location of an object corresponding with an estimated location of the object. In other words, the machine-learned model may determine that the location of the object, as indicated in the object data, corresponds with the estimated location. For instance, the machine-learned model may be trained to determine that the location corresponds with the estimated location based at least in part on one or more of a distance between the location and the estimated location, an orientation of the object and an estimated orientation of the object, a size of the object and an estimated size of the object, a classification of the object and a predicted classification of the object, or the like. In some examples, associations between tracks and associated objects may be made for multiple objects and trajectories at a time.

In some examples, the machine-learned model may, during the trajectory estimation subprocess, determine tracked object data associated with the specific object, the tracked object data including the object data and a trajectory traversed by the object during a period of time that includes the current instance of time (e.g., from $t_{0-N}$-$t_0$). In examples, the machine-learned model determines the tracked object data based on the association of the specific object data with the specific tracking data. For instance, the machine-learned model may determine a trajectory of the object from $t_{0-1}$-$t_0$ based at least in part on the location of the object at $t_0$ and a prior location of the object at $t_{0-1}$. In some examples, the machine-learned model may, during the trajectory estimation subprocess, determine tracked object data for multiple objects.

In some examples, the machine-learned model may, during the track storage subprocess, store trajectories of objects in a memory that is accessible to the machine-learned model. In some instances, this can be a long short-term memory of the machine-learned model. In some examples, because the machine-learned model may be run continuously as the vehicle traverses the environment, the machine-learned model may continue to update each stored trajectory of an object as the trajectory of that object progresses.

In some examples, the techniques may also include receiving, from the machine-learned model, an output including at least the tracked object data. That is, the tracked object data received as the output from the machine-learned model may indicate, for each object in the environment, object data associated with that object (e.g., a bounding box, classification, velocity, confidence, etc.) and a trajectory traversed by that object through the environment.

In some examples, the vehicle may be controlled based at least in part on the tracked object data. For instance, at least a portion of the tracked object data may be used as in input to another system associated with the vehicle, such as a prediction system, planning system, or the like.

As noted above, this disclosure is also directed to techniques for end-to-end training of a machine-learned model that includes multiple portions (e.g., stages, subprocesses, components, etc.). When a machine-learned model is trained end-to-end, outputs of the machine-learned model are used to train individual portions of the machine-learned model, which may otherwise exist as independent machine-learned models. In this way, the intermediary outputs of one portion of the machine-learned model may be specifically tailored for use as inputs by other portions of the machine-learned model.

By way of example, and not limitation, a method associated with end-to-end training of a machine-learned model may include techniques of receiving sensor data representing a vehicle traversing an environment. In some examples, the sensor data may comprise stored log data associated with the vehicle. The sensor data/log data may be image data, lidar data, radar data, time of flight data, or the like. In some examples, the sensor data may be a time-ordered collection of image frames representing the sensor data associated with the environment, such that a first frame represents the environment at a first time, a second frame represents the environment at a second time, and so forth.

In some examples, the techniques may also include receiving ground truth data associated with an object in the environment that is represented in the sensor data. In some examples, the ground truth data may include tracked object data associated with the object. As such, the ground truth data may include a bounding box associated with the object, a trajectory traversed by the object, a classification of the object, or the like. In some examples, the ground truth data may be determined by a human labeler, a trained machine-learned model, or the like. In some examples, the ground truth data may include a time-ordered collection of image frames representing the sensor data associated with the environment, wherein each frame has been annotated to indicate information about objects in the environment at respective times, the information including bounding boxes, trajectories, classifications, and the like.

In some examples, the sensor data may be input into a machine-learned model. In various examples, the machine-learned model may include a first portion (e.g., object detection portion) that is configured to determine, based at least in part on the sensor data, object data associated with the object. As such, the object data may include at least a predicted bounding box associated with the object. Additionally, in some examples, the machine-learned model may include a second portion (e.g., object tracking portion) that is configured to determine, based at least in part on the object data determined by the first portion, tracking data associated with a movement of the object through the environment. In some examples, the tracking data may include a predicted trajectory traversed by the object through the environment.

In some examples, the techniques may include receiving an output from the machine-learned model. The output may include predicted tracked object data that includes, among other things, the predicted bounding box and the predicted trajectory. Based on the output, the ground truth data and the predicted tracked object data may be compared to determine whether differences exist between the ground truth data and predicted tracked object data. In some instances, if a difference is determined to meet or exceed a threshold difference, a parameter of the machine-learned model may be altered to minimize the difference. In some instances, a parameter of one or more portions of the machine-learned model may be altered. For example, a parameter of the first portion of the machine-learned model may be altered to tailor the object data for use by the second portion of the machine-learned model such that the difference between the ground truth data and the predicted tracked object data is minimized. Additionally, or alternatively, a parameter of the second portion of the machine-learned model may be altered to help minimize the difference. In some examples, altering a parameter of the machine-learned model may include retraining the first portion or the second portion based on the difference, updating software of the first portion or the second portion, or the like.

According to the techniques described herein, the performance of vehicle perception systems and/or machine-learned models can be improved. By utilizing temporal history of object trajectories when making associations between detected objects and stored tracking data, the machine-learned model/perception system is less vulnerable to object occlusions, and data switching (e.g., associating the wrong track with the wrong object). Additionally, by training a perception system model end-to-end according to the techniques of this disclosure, intermediary outputs from one portion of a model can be tailored for other portions of the model, ultimately leading to better overall outputs. In the context of autonomous vehicles, the techniques described herein provide for more accurate machine-learned models, which can increase the safety of autonomous vehicles by making more accurate predictions, such as by improving safe decision making and minimizing the risk of adverse events. These and other improvements will be readily apparent to those having ordinary skill in the art.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. For example, the techniques can be utilized in an aviation or nautical context, or in other machine-learning and training contexts. Furthermore, the techniques described herein can be used with real data (e.g., captured using sensor(s)), simulated data (e.g., generated by a simulator), or any combination of the two.

FIG. 1 is a pictorial flow diagram illustrating an example process 100 according to the techniques described herein for using a machine-learned model to determine tracked object data. In examples, the vehicle 102 may be associated with one or more sensor components. In at least one example, the sensor component(s) may capture sensor data 106 associated with an environment 104 surrounding the vehicle 102. The environment 104 may include one or more objects, such as the object 108(1), which is a vehicle, and the object 108(2), which is a pedestrian. The objects 108(1) and 108(2) may be referred to herein collectively as "objects 108." In at least one example, the sensor component(s) may include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. The sensor component(s) may generate sensor data 106 associated with the environment 104, which may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc. In some examples, the sensor data 106 can be in the form of multiple snapshots (e.g., frames) that can be input to the machine-learned model 112 model as a collection such that an objects movement can be tracked over time. In some instances, the sensor data 106 may be a time-ordered collection of frames representing the environment 104 over a period of time. For example, sensor data 106 can be a collection of five frames representing frame in a time-ordered manner than may be updated in a rolling fashion (e.g., wherein a new frame is added to the collection and an old frame is removed).

In at least one example, the sensor data 106 may be sent to one or more computing device(s) 110 associated with the vehicle 102. The one or more computing device(s) 110 may be on-board the vehicle 102 or remotely accessible to the vehicle 102 via a network connection. The one or more computing device(s) 110 may be executing a machine-learned model 112 using resources (e.g., compute, memory, processing cores, etc.) of the computing device(s) 110. In one example, the machine-learned model 112 is associated with a perception system of the vehicle 102. The machine-learned model may include a detection component 114 and a tracking component 122.

As shown in FIG. 1, the sensor data 106 is forwarded as an input to the machine-learned model 112. Based at least in part on the sensor data 106, the detection component 114 of the machine-learned model 112 may output object data 116. In the illustrative example, the object data 116 includes top-down data 118 representing a view of the environment 104 from a top-down (e.g., birds-eye) perspective. However, this is not intended to be so limiting, and the object data 116 may include other representations of data. In some instances, the object data 116 may include bounding boxes associated with objects 108 detected in the environment 104 by the detection component 114, such as the bounding box 120(1) associated with the object 108(1) and the bounding box 120(2) associated with the object 108(2).

The object data 116 may, in some instances, be used in whole or in part as an input to a tracking component 122 of the machine-learned model 112. Although not shown in FIG. 1, in some examples the tracking component 122 may also receive, as an input, stored tracking data associated with the objects 108(1) and 108(2), which is discussed in further detail below. Based at least in part on the object data 116 and/or the stored tracking data, the tracking component 122 may determine, and the machine-learned model 112 may output, tracked object data 124. In some examples, the tracked object data 124 may include the top-down data 118 representing the view of the environment 104 from the top-down perspective, with movement data indicative of object movement. In some examples, in addition to including the object data 116 (e.g., the bounding boxes 120(1) and 120(2)), the tracked object data 124 may also include trajectories traversed by the objects in the environment 104, such as the trajectory 126(1) traversed by the object 108(1) and the trajectory 126(2) traversed by the object 108(2).

In some examples, the tracking component 122 may be configured to perform multiple subprocesses to determine the trajectories 126 traversed by the detected objects 108 during a period of time preceding the current time. For instance, the tracking component 122 may perform the location estimation subprocess, the track-location association subprocess, the trajectory estimation subprocess, and/or the track storage subprocess, as described above and herein. In some examples, these subprocesses may be stored as separate components of the tracking component 122 that execute independently of one another, or may be considered as logical operations associated with the way the tracking component 122 of the machine-learned model 112 determines the tracked object data 124.

In some examples, the tracking component 122 may, during the location estimation subprocess, determine estimated locations of the objects 108(1) and 108(2) in the environment 104 at a current time $t_0$. Additionally, or alternatively, the tracking component 122 may determine estimated orientation of the objects 108(1) and 108(2), estimated sizes of the objects 108(1) and 108(2), estimated classifications of the objects 108(1) and 108(2), or the like, as well as any other feature that may be indicated within the object data 116 as described above and herein. In examples, the tracking component 122 determines the estimated locations of the objects 108(1) and 108(2) at $t_0$ based at least in part on stored tracking data associated with the objects 108(1) and 108(2). The stored tracking data may indicate trajectories traversed by the objects 108(1) and 108(2) during a past period of time from $t_{0-N}$-$t_{0-1}$ (e.g., a period of time that ends moments before the current instance of time at $t_0$). For instance, the stored tracking data may include multiple, prior frames of the sensor data 106, tracking data, tracked object data 124, etc., where each individual frame is associated with a different instance of time (e.g., $t_{0-1}$, $t_{0-2}$, $t_{0-3}$, $t_{0-4}$, $t_{0-5}$, and so forth). Using the frames of the stored tracking data, the tracking component 122 may determine the estimated locations of the objects 108(1) and 108(2) at the current instance of time $t_0$.

In some examples, the tracking component 122 may, during the track-location association subprocess, associate specific object data 116 (e.g., the bounding boxes 120(1) and 120(2)) with specific tracking data (e.g., the trajectories 126(1) and 126(2), respectively) based at least in part on the locations of the objects 108(1) and 108(2) corresponding with the estimated locations of the objects 108(1) and 108(2). In other words, the tracking component 122 may determine that the locations of the objects 108(1) and 108(2), as indicated in the object data 116, correspond with the estimated locations.

In some examples, the tracking component 122 may, during the trajectory estimation subprocess, determine tracked object data 124 associated with specific objects 108(1) or 108(2), the tracked object data 124 including the object data 116 and the trajectories 126(1) and 126(2) traversed by the objects 108(1) and 108(2) during a period of time that includes the current instance of time (e.g., from $t_{0-N}$-$t_0$).

In some examples, the tracking component 122 or the machine-learned model 112 may, during the track storage subprocess, store the trajectories 126(1) and 126(2) of the objects 108(1) and 108(2) in a memory that is accessible to the machine-learned model 112 and/or the tracking component 122. In some instances, the memory may include a long short-term memory of the machine-learned model 112 and/or the tracking component 122. In some examples, because the machine-learned model 112 may be run continuously as the vehicle 102 traverses the environment 104, the tracking component 122 may continue to update each stored trajectory of the objects 108(1) and 108(2) as they progress through the environment 104.

The tracked object data 124 may, in some examples, be forwarded to a prediction component 128 executing on the computing device(s) 110. In one example, the prediction component 128 includes one or more machine-learned models that are trained to make predictions about the objects in the environment 104. As such, the prediction component 128 may determine prediction data 130 associated with the objects based at least in part on some or all of the tracked object data 124. In some examples, the prediction data 130 may include the top-down data 118 representing the view of the environment 104 from the top-down perspective. Additionally, or alternatively, the prediction data 130 may indicate one or more prediction(s) associated with the objects. For instance, the prediction(s) 132(1) and 132(2) associated with the objects 108(1) and 108(2), respectively, include trajectories that the objects 108(1) and 108(2) are predicted to traverse in the environment 104 during a future period of time.

In some examples, the prediction data 130 may be forwarded as an input to a planner component 134 of the vehicle 102 that is executing on the computing device(s) 110. In one example, the planner component 134 includes one or more machine-learned models and/or other algorithms that are configured to determine a planned trajectory for the vehicle 102 to follow through the environment 104.

As such, the planner component 134 may determine the planned trajectory of the vehicle 102 based at least in part on the tracked object data 124 and/or the prediction data 130.

In various examples, any one of the sensor data 106, the object data 116, the tracked object data 124, or the prediction data 130 may be formatted as a multi-channel image, where individual channels of the multi-channel image may represent a selection of information. For instance, a first channel of a multi-channel image may include bounding box(es) associated with object(s), a second channel of the multi-channel image may include velocity information associated with the object(s), a third channel of the multi-channel image may include environmental data (e.g., surface or lane markings, traffic light information, etc.), and so forth. Additionally, in some examples, multiple different channels of the multi-channel image may include a portion of the same information. For instance, a first channel and a second channel of the multi-channel image may each include bounding boxes associated with the same objects in an environment. A channel can be represented as a color and/or a layer in a three-dimensional image stack, for example.

Figure 2:
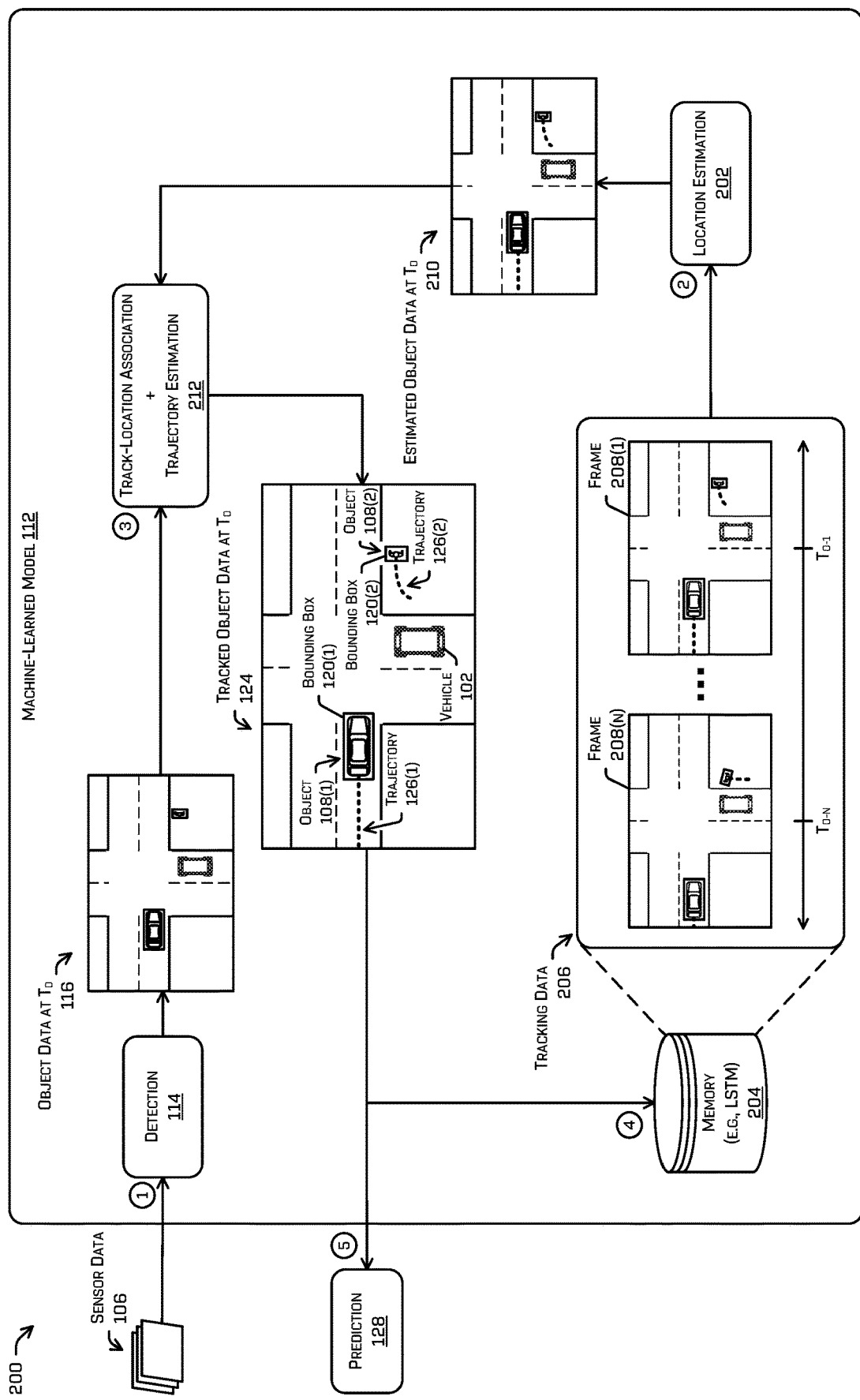
FIG. 2 illustrates example detail of a machine-learned model for determining tracked object data based on input sensor data.

FIG. 2 illustrates example detail 200 of the machine-learned model 112 for determining tracked object data 124 based on input sensor data 106. The sensor data 106 may be image data, lidar data, radar data, and/or time of flight data associated with an environment in which a vehicle is operating. At "1," the detection component 114 of the machine-learned model 112 receives sensor data 106 and determines the object data 116 associated with the objects at a current time $t_0$. The object data 116 may then be forwarded to a track-location association and trajectory estimation component 212 of the machine-learned model 112. In some examples, the track-location association and trajectory estimation component 212 may be part of the tracking component 122 described herein.

At "2," a location estimation component 202 may receive tracking data 206 associated with objects in the environment and determine, based on the tracking data 206, estimated object data 210 associated with the objects at the current time $t_0$. The location estimation component 202 may receive the tracking data 206 from a memory 204 of the machine-learned model 112, which may include a long short-term memory. The tracking data 206 may include one or more frames 208(1)-208(N) (where N can represent any integer greater than or equal to two) of sensor data, tracking data, or the like. In some examples, a first frame 208(1) is indicative of trajectories and/or locations of the objects in the environment at $t_{0-1}$, a second frame may be indicative of the trajectories and/or locations of the objects in the environment at $t_{0-2}$, and an Nth frame 208(N) is indicative of trajectories and/or locations of the objects in the environment at $t_{0-N}$. The location estimation component 202 may utilize the multiple frames 208 in order to determine the estimated object data 210 at the current time $t_0$. The estimated object data 210 may be forwarded to the track-location association and trajectory estimation component 212.

At "3," the track-location association and trajectory estimation component 212 may determine the tracked object data at the current time $t_0$ based at least in part on the object data 116 and the estimated object data 210. For instance, the track-location association and trajectory estimation component 212 may determine that a location of an object shown in the object data 116 corresponds with an estimated location of the object shown in the estimated object data 210. Based on the corresponding locations, the track-location association and trajectory estimation component 212 may associate stored tracking data with the object after determining which track corresponds with which object. Additionally, the track-location association and trajectory estimation component 212 may estimate a trajectory traversed by the object based on a location of the object at $t_{0-1}$ and the current location of the object at $t_0$. This estimated trajectory may be included in the tracked object data 124. As such, for each of the objects 108 shown in the tracked object data 124, a bounding box 120 associated with the object 108 may be indicated, as well as the trajectory 126 traversed by the object 108.

At "4," the tracked object data 124 at $t_0$ is stored in the memory 204. In this way, the tracked object data 124 at $t_0$ may be utilized by the location estimation component 202 to estimate object data for a future time $t_{0+1}$. Additionally, at "5," the tracked object data 124 is forwarded to the prediction component 128 for predicting future trajectories and other behavior of the objects 108(1) and 108(2).

Figure 3:
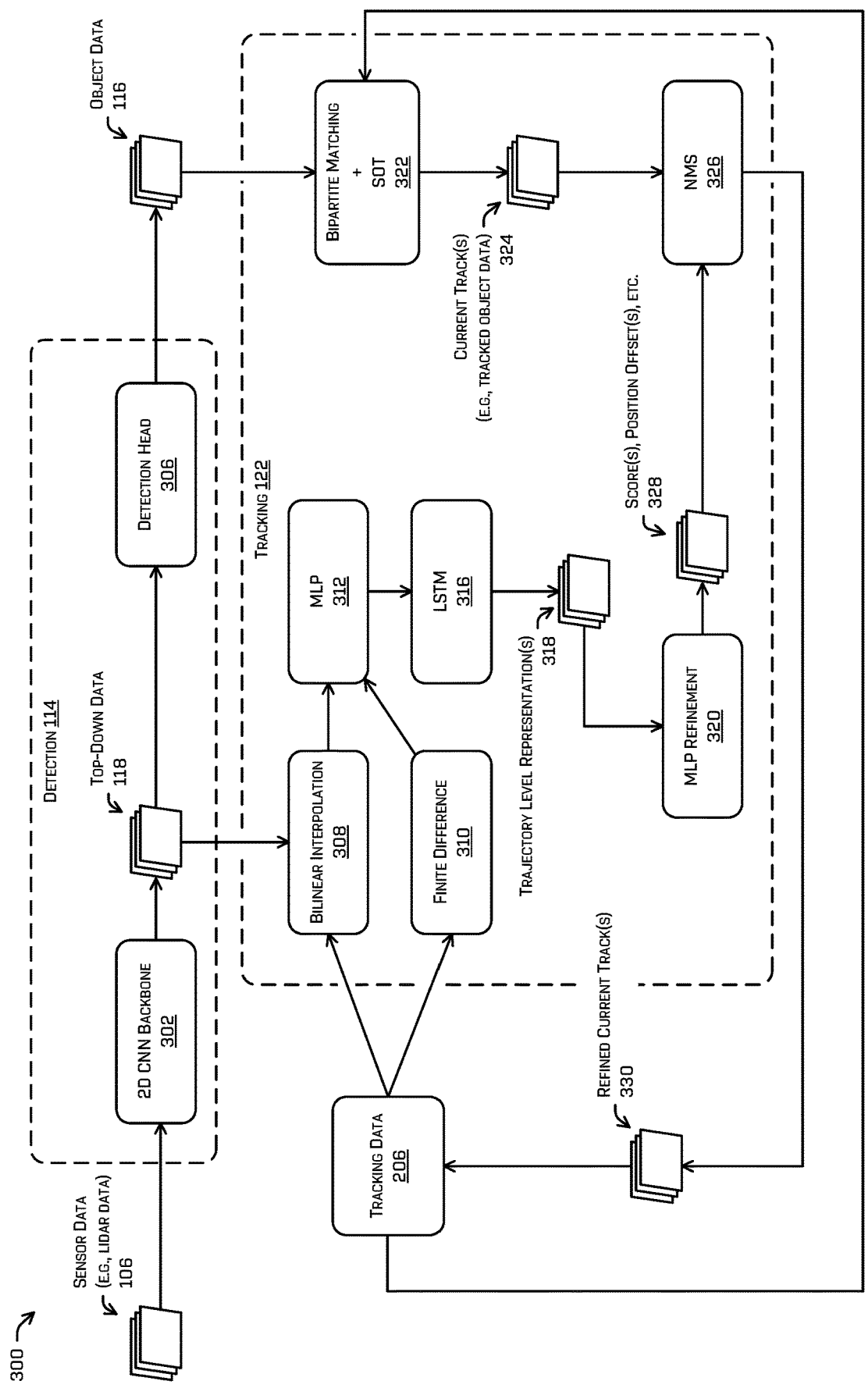
FIG. 3 illustrates example detail of a detection component and a tracking component of a machine-learned model according to some of the technologies disclosed herein.

FIG. 3 illustrates example detail 300 of a detection component 114 and a tracking component 122 of a machine-learned model according to some of the technologies disclosed herein. As shown, the detection component 114 may include a 2-dimensional convolutional neural network (2D CNN) backbone 302 that can determine top-down data 118 and a detection head 306 that can determine the object data 116. The tracking component 122 may include a bilinear interpolation component 308, a finite difference component 310, a multilayer perception (MLP) component 312, a long short-term memory (LSTM) component 316, an MLP refinement component 320, a bipartite matching and single object tracking (SOT) component 322, and a non-maximal suppression (NMS) component 326.

The bilinear interpolation component 308 may receive the top-down data 118 and the tracking data 206 and determine objects in the environment that are new observations (e.g., objects for which no tracking data 206 exists), and vice-versa. For instance, if the tracking data indicates that there are three objects in the environment, but the top-down data 118 only indicates two objects, the bilinear interpolation component 308 may be leveraged to determine why there isn't matching tracking data (e.g., new object in the environment, object left the environment, etc.).

The LSTM component 316 may receive data and other information associated with the objects/features, such as a feature tensor, finite differences, and an output from the MLP component 312, and determine one or more trajectory-level representation(s) 318. The MLP refinement component 320 may utilize the trajectory level representation(s) 318 to determine score(s), position offset(s), and other data 328.

The bipartite matching and SOT component 322 may perform a one-to-one matching between tracked objects as indicated in the tracking data 206 and new observations of objects included in the object data 116. That is, the bipartite matching and SOT component 322 may determine one or more current tracks 324 associated with the objects in the environment (e.g., tracked object data 124).

The NMS component 326 may utilize the current track(s) 324 and the score(s), position offset(s), and other data 328 to determine refined current track(s) 330. The refined current track(s) may be forwarded and stored with the other tracking data 206. In this way, the refined current track(s) 330 can be used to determine the trajectory level representation(s) 318 and/or additional current track(s) 324 at a future time.

Figure 4:
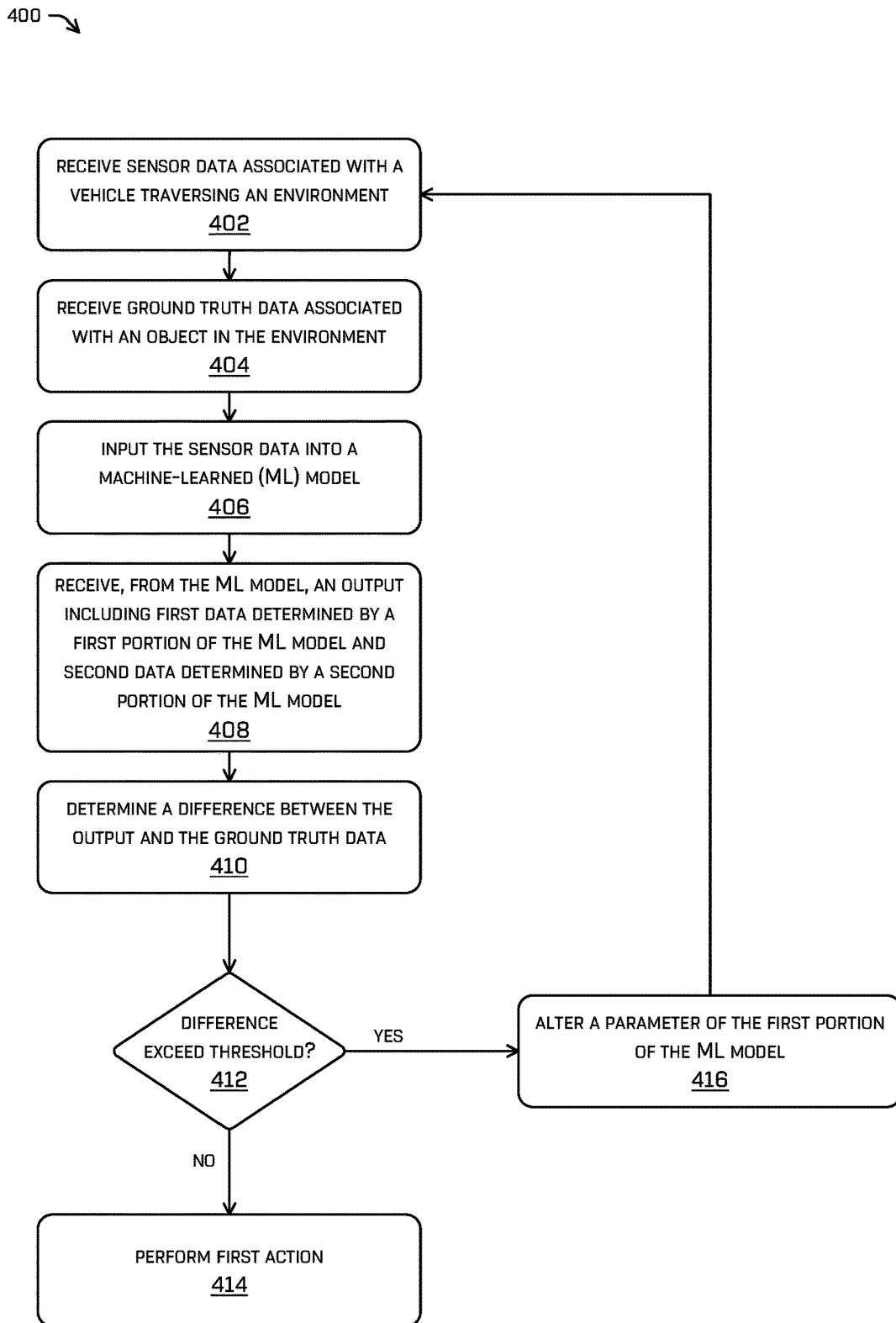
FIG. 4 is a flowchart illustrating an example method associated with training a machine-learned model end-to-end such that an output of a first portion of the machine-learned model is tailored to be used as an input to a second portion of the machine-learned model.
Figure 5:
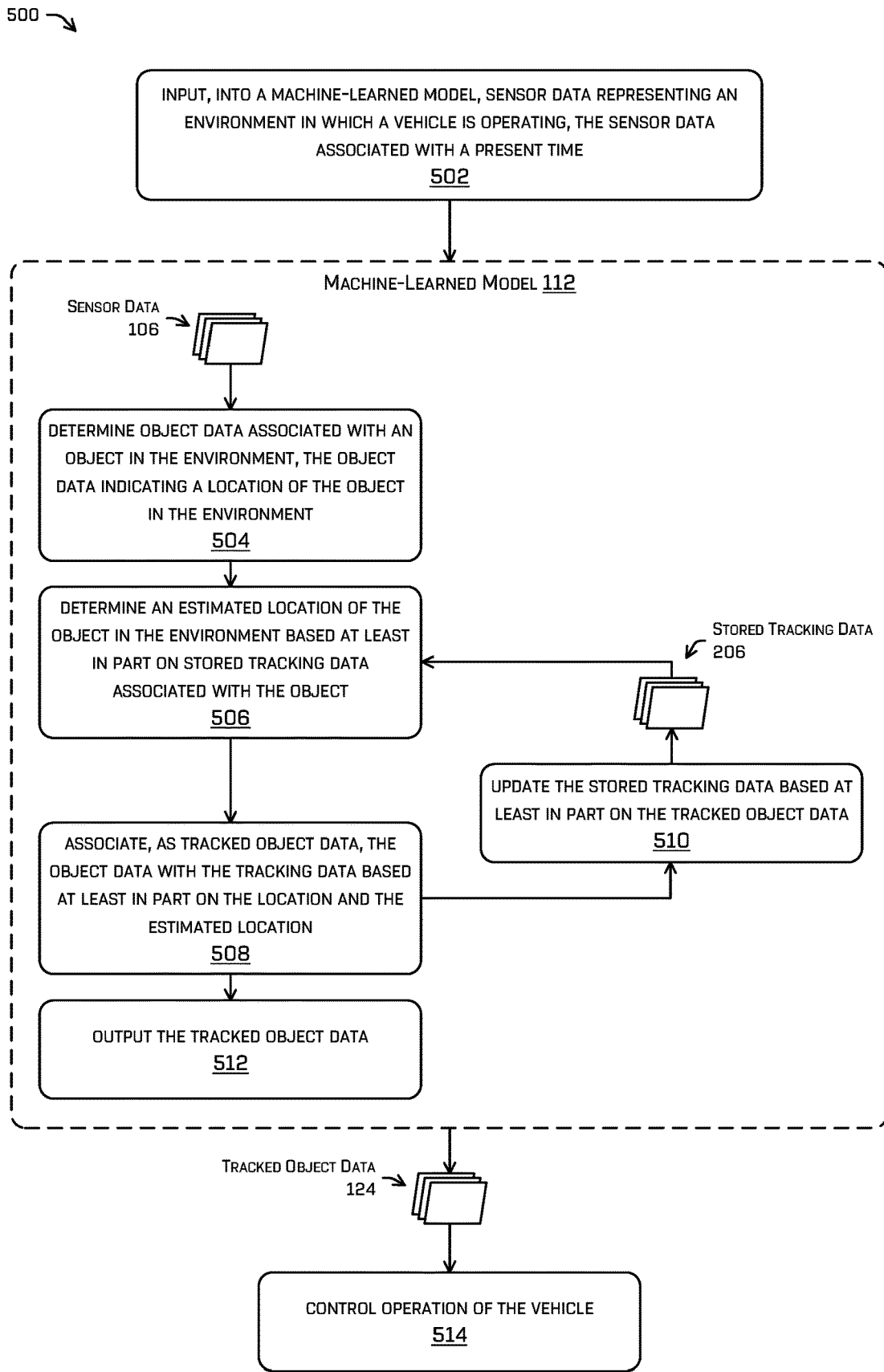
FIG. 5 is a flowchart illustrating an example method associated with a machine-learned model determining tracked object data for use by a vehicle.

FIGS. 4 and 5 are flowcharts showing example methods of presenting various user interfaces on a display that are associated with monitoring a vehicle. The methods illustrated in FIGS. 4 and 5 are described with reference to one or more of the vehicles, systems, and/or user interfaces described in FIGS. 1-3 for convenience and ease of understanding. However, the methods illustrated in FIGS. 4 and 5 are not limited to being performed using the vehicles, systems, and/or user interfaces described in FIGS. 1-3, and may be implemented using any of the other vehicles, systems, and user interfaces described in this application, as well as vehicles, systems, and user interfaces other than those described herein. Moreover, the vehicles, systems, and user interfaces described herein are not limited to performing the methods illustrated in FIGS. 4 and 5.

The methods 400 and 500 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the methods 400 and 500 may be combined in whole or in part with each other or with other methods.

FIG. 4 is a flowchart illustrating an example method 400 associated with training a machine-learned model end-to-end such that an output of a first portion of the machine-learned model is tailored to be used as an input to a second portion of the machine-learned model. The method 400 begins at operation 402, which includes receiving sensor data associated with a vehicle traversing an environment. For instance, the computing device(s) 110 may receive the sensor data 106 associated with the environment 104 surrounding the vehicle 102. In some examples, the environment may include one or more objects, such as the objects 108(1) and 108(2). In some examples, the sensor data may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), time of flight (ToF) sensor data, etc. In some examples, the sensor data may be real sensor data (e.g., generated by a sensor of the vehicle) or simulated sensor data.

At operation 404, the method 400 includes receiving ground truth data associated with an object in the environment. For instance, the computing device(s) 110 may receive the ground truth data. In some examples, the ground truth data may include tracked object data associated with the object. As such, the ground truth data may include a bounding box associated with the object, a trajectory traversed by the object, a classification of the object, or the like. In some examples, the ground truth data may be determined by a human labeler, a trained machine-learned model, or the like.

At operation 406, the method 400 includes inputting the sensor data into a machine-learned model. For instance, the computing device(s) 110 may input the sensor data 106 into the machine-learned model 112. At operation 408, the method 400 includes receiving, from the machine-learned model, an output including first data determined by a first portion of the machine-learned model and second data determined by a second portion of the machine-learned model. For instance, the output may include tracked object data 124 that includes the first data (e.g., object data determined by the detection component 114) and the second data (e.g., trajectory data determined by the tracking component 122). That is, the output may include at least a predicted bounding box associated with the object and a predicted trajectory traversed by the object. As described herein, in some examples, the second portion of the machine-learned model may determine the second data based at least in part on the first data determined by the first portion of the machine-learned model.

At operation 410, the method 400 includes determining a difference between the output and the ground truth data. In some examples, the difference(s) between the output and the ground truth data may be differences between the trajectory and the predicted trajectory, a difference between the bounding box and the predicted bounding box, and/or the like. At operation 412, the method 400 includes determining whether the difference exceeds a threshold difference. If the difference does not exceed the threshold difference (e.g., is less than the threshold difference), then the method 400 proceeds to operation 414. However, if the difference meets or exceeds the threshold difference, the method 400 proceeds to operation 416.

At operation 414, the method 400 includes performing a first action. In some examples, the first action can include determining that the machine-learned model is a trained machine-learned model. Additionally, or alternatively, the first action can include sending the machine-learned model to the vehicle for use by the vehicle to traverse an environment. In some examples, the first action can include validating the performance of the machine-learned model in a simulation or with additional sensor data.

At operation 416, the method 400 includes altering a parameter of the first portion of the machine-learned model. For instance, a parameter of the detection component 114 or the tracking component 122 may be altered, as well as, or in the alternative, subprocesses performed by those components. In some examples, altering the parameter may comprise altering a software component of the first portion of the model or retraining the first portion of the model based at least in part on the difference. In this way, the first data determined by the first portion of the model may be adjusted such that, in future predictions, the first data is tailored for use as an input for the second portion of the machine-learned model.

FIG. 5 is a flowchart illustrating an example method 500 associated with a machine-learned model determining tracked object data for use by a vehicle. The method 500 begins at operation 502, which includes inputting, into a machine-learned model, sensor data representing an environment in which a vehicle is operating, the sensor data associated with a present time. For instance, the computing device(s) 110 may input the sensor data 106 associated with the environment 104 surrounding the vehicle 102 into the machine-learned model 112. In some examples, the environment represented in the sensor data 106 may include one or more objects, such as the objects 108(1) and 108(2). In some examples, the sensor data may include, but is not limited to, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), image data (e.g., RGB data, IR data, intensity data, depth data, etc.), wheel encoder data, microphone data, environment sensor data (e.g., temperature sensor data, humidity sensor data, light sensor data, pressure sensor data, etc.), time of flight (ToF) sensor data, etc. In some examples, the sensor data may be real sensor data (e.g., generated by a sensor of the vehicle) or simulated sensor data.

At operation 504 of the method 500, the machine-learned model 112 may determine object data associated with an object in the environment, the object data indicating a location of the object in the environment. For instance, the detection component 114 of the machine-learned model 112 may determine the object data 116 associated with an object 108 in the environment 104. In some examples, the object data may include top-down data 118 representing a view of the environment from a top-down (e.g., birds-eye) perspective. In some instances, the object data 116 may include bounding boxes associated with objects detected in the environment by the detection component 114, such as the bounding box 120(1) associated with the object 108(1) and the bounding box 120(2) associated with the object 108(2), as illustrated in FIG. 1.

At operation 506 of the method 500, the machine-learned model 112 may determine an estimated location of the object in the environment based at least in part on stored tracking data 206 associated with the object. For instance, the tracking component 122 may determine the estimated location of the object in the environment based at least in part on the stored tracking data 206. In some examples, the location estimation component 202, which may be a component or subprocess of the tracking component 122, may determine the estimated location of the object. In some examples, determining the estimated location may comprise determining an estimated location of a bounding box associated with the object.

At operation 508 of the method 500, the machine-learned model 112 may associate, as tracked object data, the object data with the tracking data based at least in part on the location and the estimated location. For instance, the tracking component 122 may associate, as the tracked object data 124, the object data 116 with the tracking data 206. In some examples, a track-location association component and/or a trajectory estimation component, which may be components or subprocesses of the tracking component 122, may associate the tracked object data. In some examples, the associating of the object data with the stored tracking data may be based at least in part on a proximity between the location and the estimated location.

At operation 510 of the method 500, the machine-learned model 112 may update the stored tracking data based at least in part on the tracked object data. For instance, the tracking component 122 of the machine-learned model 112 may update the stored tracking data. In some examples, the updated stored tracking data 206 may be stored in a memory accessible to the machine-learned model 112 and/or the tracking component 122, such as a long short-term memory.

At operation 512 of the method 500, the machine-learned model 112 may output the tracked object data. At operation 514, the method 500 includes controlling operation of the vehicle. For instance, the operation of the vehicle may be controlled based at least in part on the tracked object data 124 received from the machine-learned model 112. In some examples, a prediction component 128 of the vehicle 102 may utilize the tracked object data 124 to make one or more predictions about the objects in the environment, such as predicted future trajectories, and the like, and the vehicle may be controlled based at least in part on the predictions.

Additionally, or alternatively, a planner component 134 of the vehicle 102 may utilize the tracked object data 124 and/or the predictions based on the tracked object data to control operation of the vehicle. For instance, the planner component 134 may determine a trajectory for the vehicle 102 to traverse through the environment based at least in part on the tracked object data or the predictions.

Figure 6:
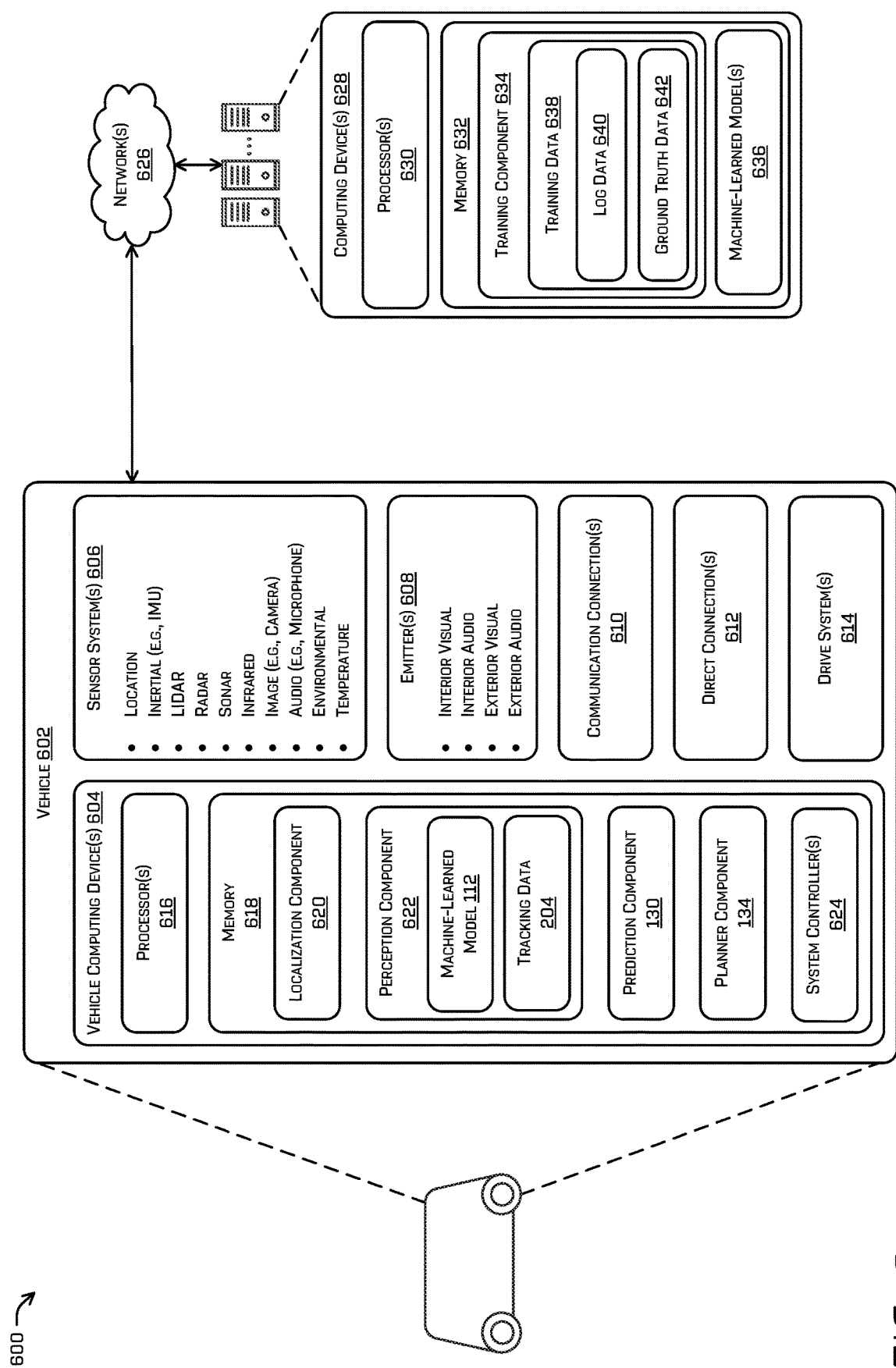
FIG. 6 is a block diagram illustrating an example system that may be used for performing the techniques described herein.

FIG. 6 is a block diagram illustrating an example system that may be used for performing the techniques described herein. In at least one example, a vehicle 602, which can correspond to the vehicle 102 described above with reference to FIGS. 1-5, can include one or more vehicle computing device(s) 604 (which may correspond with the computing device(s) 110), one or more sensor systems 606, one or more emitters 608, one or more communication connections 610, at least one direct connection 612, and one or more drive systems 614.

In at least one example, a vehicle 602 can be an autonomous vehicle configured to operate according to a Level 6 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 602 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, a perception component 622, a prediction component 130, a planner component 134, and one or more system controller(s) 624.

In at least one example and as described above, the localization component 620 can determine a pose (position and orientation) of the vehicle 602 in relation to a local and/or global map based at least in part on sensor data received from the sensor component(s) 606 and/or map data associated with a map of an environment in which the vehicle 602 is operating. In at least one example, the localization component 620 can include, or be associated with, a calibration component that is capable of performing operations for calibrating (determining various intrinsic and extrinsic parameters associated with any one or more of the sensor component(s) 606), localizing, and mapping substantially simultaneously.

In at least one example, the perception component 622 can perform object detection, segmentation, and/or classification based at least in part on sensor data received from the sensor component(s) 606. In at least one example, the perception component 622 can receive raw sensor data (e.g., from the sensor component(s) 606). In at least one example, the perception component 622 can receive sensor data and can utilize one or more processing algorithms and/or machine-learned models to perform object detection, segmentation, and/or classification with respect to object(s)

identified in the sensor data. In some examples, the perception component 622 can associate a bounding region (e.g., bounding box or otherwise an instance segmentation) with an identified object and can associate a confidence score associated with a classification of the identified object with the identified object.

In examples, the perception component 622 can include the machine-learned model 112, as well as the tracking data 206. The machine-learned model 112, or at least a tracking component of the machine-learned model 112, may utilize the tracking data 206 to estimate locations of objects in the environment, as described herein. In some examples, the tracking data 206 is stored in a memory, such as a long short-term memory.

The prediction component 130 can receive sensor data from the sensor component(s) 606, map data, and/or perception data output from the perception component 622 (e.g., processed sensor data), and can output predictions associated with one or more objects within the environment of the vehicle 602. Predictions can include predicted trajectories associated with objects in the environment in which the vehicle 602 is operating. As described herein, the prediction component can also receive tracked object data 124 output by the machine-learned model 112.

The planner component 134 may receive data, information, and/or outputs from the localization component 620, the perception component 622, the prediction component 130, as well as map data, and may generate one or more proposed vehicle operations (e.g., proposed trajectories). Additional details of localization components, perception components, prediction components, and/or planner components that are usable can be found in U.S. Pat. No. 9,612,123, issued on Apr. 4, 2017, and U.S. Pat. No. 10,363,390, issued on Jul. 16, 2019, the entire contents of both of which are incorporated by reference herein in their entirety and for all purposes. In some examples (e.g., where the vehicle 602 is not an autonomous vehicle), one or more of the aforementioned components can be omitted from the vehicle 602. In at least one example, the planner component 134 receives tracked object data 124 from the machine-learned model 112 of the perception component 622.

In at least one example, the vehicle computing device(s) 604 can include one or more system controller(s) 624, which can be configured to control steering, propulsion, braking, safety, emitters, communication, and other systems of the vehicle 602. These system controller(s) 624 can communicate with and/or control corresponding systems of the drive system(s) 614 and/or other systems of the vehicle 602.

While the components described above are illustrated as "onboard" the vehicle 602, in other implementations, the components can be remotely located and/or accessible to the vehicle 602. For instance, the component can be remotely located on the computing device(s) 628 and accessible to the vehicle 602 via one or more network(s) 626. Furthermore, while the components are described above as "components," such components can comprise one or more components and/or modules, which can be part of a system, for performing operations attributed to each of the components.

In at least one example, the localization component 620, the perception component 622, the prediction component 130, and the planner component 134 can process data, as described above, and can send their respective outputs over the network(s) 626, to computing device(s) 628. In at least one example, the localization component 620, the perception component 622, the prediction component 130, and the planner component 134 can send their respective outputs to the computing device(s) 628 at a particular frequency, after a lapse of a predetermined period of time, in near real-time, etc.

In at least one example, the sensor component(s) 606 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 606 can provide input to the vehicle computing device(s) 604. In some examples, the sensor component(s) 606 can preprocess at least some of the sensor data prior to sending the sensor data to the vehicle computing device(s) 604. In at least one example, the sensor component(s) 606 can send sensor data, via the network(s) 626, to the computing device(s) 628 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), or the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s), such as the computing device(s) 628, as well as other remote or local computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 626. For example, the communications connection(s) 610 can enable Wi-Fi-based communication such as via frequencies defined by the IEEE 602.11 standards, short range wireless frequencies such as BLUETOOTH, or any suitable wired or wireless communications protocol that enables the respective computing device to interface with the other computing device(s).

The direct connection(s) 612 can directly connect the drive system(s) 614 and other systems of the vehicle 602. In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor component(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor component(s) 606, emitter(s) 608, and the communication connection(s) 610 are shown onboard the vehicle 602. However, in some examples, the vehicle computing device(s) 604, sensor component(s) 606, emitter(s) 608, and the communication connection(s) 610 can be implemented outside of an actual vehicle (i.e., not onboard the vehicle 602).

As described above, the vehicle 602 can send data to the computing device(s) 628, via the network(s) 626. In some examples, the vehicle 602 can send raw sensor data to the computing device(s) 628. In other examples, the vehicle 602 can send processed sensor data and/or representations of sensor data to the computing device(s) 628 (e.g., data output from the localization component 620, the perception component 622, the prediction component 130, the planner component 134, the machine-learned models, etc.). In some examples, the vehicle 602 can send data to the computing device(s) 628 at a particular frequency, after a lapse of a predetermined period of time, in near real-time, etc.

The computing device(s) 628 can receive the data (raw or processed) from the vehicle 602 and/or other data collection devices, as well as data from one or more third party sources and/or systems. In at least one example, the computing device(s) 628 can include processor(s) 630 and memory 632 communicatively coupled with the processor(s) 630. In the illustrated example, the memory 632 of the computing device(s) 628 stores a training component 634, and one or more machine-learned model(s) 636.

The training component 634 includes functionality for training the one or more machine-learned model(s) 636, which may include the machine-learned model 112. The training component 634 may include or store training data 638 for use in training the machine-learned model(s) 636. The training data 638 may include log data 640 associated with a vehicle traversing an environment. In some examples, the log data 640 may be sensor data representing an environment in which the vehicle 602 was operating. That is, in some examples, the log data 640 may comprise image data, lidar data, radar data, or the like.

The training data 638 may also include ground truth data 642. In some examples, for every instance of log data 640 used to train the machine-learned model(s) 636, a corresponding instance of ground truth data 642 may be stored. In some examples, the ground truth data 642 may include tracked object data associated with an object. As such, the ground truth data 642 may include a bounding box associated with an object, a trajectory traversed by the object, a classification of the object, or the like. In some examples, the ground truth data 642 may be determined by a human labeler, a trained machine-learned model, or the like.

The processor(s) 616 of the vehicle 602 and the processor(s) 630 of the computing device(s) 628 can be any suitable processor capable of executing instructions to process data and perform operations as described herein. By way of example and not limitation, the processor(s) 616 and 632 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 634 are examples of non-transitory computer-readable media. Memory 618 and 634 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 628 and/or the components of the computing device(s) 628 can be associated with the vehicle 602. That is, the vehicle 602 can perform one or more of the functions associated with the computing device(s) 628, and vice versa.

Furthermore, while the vehicle computing device(s) 604 and the computing device(s) 628 are shown to include multiple components, in some examples, such components can be associated with more or fewer individual components. For example, the localization component 620, the perception component 622, the prediction component 130, and/or the planner component 134 can be combined into a single component. That is, while depicted as separate components, any one or more of the components can be combined.

EXAMPLE CLAUSES

A. A system comprising: one or more processors; and one or more non-transitory computer-readable media storing instructions that, when executed by the one or more processors, cause the system to perform operations comprising: receiving sensor data representing an object in an environment in which a vehicle is operating, the sensor data associated with a current time; inputting the sensor data into a machine-learned model that is configured for use in the vehicle, the machine-learned model being configured to: determine, based at least in part on the sensor data, object data including at least a bounding box associated with the object in the environment, the bounding box indicative of a location of the object in the environment at the current time; determine, based at least in part on the sensor data and based at least in part on tracking data determined from additional sensor data received by the machine-learned model prior to the current time an estimated location of the object in the environment at the current time; and associate, as tracked object data, the object data with the tracking data based at least in part on the estimated location; receiving, from the machine-learned model, an output including at least the tracked object data; and controlling the vehicle based at least in part on the tracked object data.

B. The system as recited in paragraph A, wherein the machine-learned model is further configured to: based at least in part on associating the object data with the tracking data, update the tracking data such that the trajectory intersects the location; and store the updated tracking data in a memory that is accessible to the machine-learned model.

C. The system as recited in any one of paragraphs A-B, wherein the associating the object data with the tracking data is further based at least in part on at least one of: a distance between the location and the estimated location being less than a threshold distance; a detected classification of the object corresponding with a tracked classification of the object; or a difference between a detected size of the object and a tracked size of the object being less than a threshold difference.

D. The system as recited in any one of paragraphs A-C, wherein the output received from the machine-learned model is further indicative of a future location of the object.

E. The system as recited in any one of paragraphs A-D, wherein the additional sensor data comprises a time-ordered collection of frames of sensor data representing the object over a period of time prior to the current time.

F. A method comprising: receiving, at a first time, sensor data associated with a vehicle operating in an environment; inputting the sensor data into a machine-learned model that is configured to: determine a location of an object in the environment based at least in part on the sensor data; determine an estimated location of a tracked object in the environment based at least in part on a trajectory traversed by the tracked object, the trajectory determined based at least in part on additional sensor data received by the machine-learned model prior to the first time; and associate the object with the tracked object based at least in part on the location and the estimated location; receiving, as an output from the machine-learned model, an indication of the location and the trajectory; and controlling the vehicle based at least in part on the output.

G. The method as recited in paragraph F, wherein the location and the estimated location are associated with the first time, and wherein the tracked object traversed the trajectory prior to the first time.

H. The method as recited in any one of paragraphs F-G, wherein the additional sensor data represents the object over a period of time prior to the first time.

I. The method as recited in any one of paragraphs F-H, wherein the machine-learned model is configured to classify the object as at least one of a vehicle, a pedestrian, or a cyclist.

J. The method as recited in any one of paragraphs F-I, wherein the machine-learned model is further configured to: based at least in part on associating the object with the tracked object, update the trajectory traversed by the tracked object such that the trajectory intersects the location; and store the updated trajectory in a memory that is accessible to the machine-learned model.

K. The method as recited in any one of paragraphs F-J, wherein associating the object with the tracked object is further based at least in part on a feature distance between first features associated with the object and second features associated with the tracked object.

L. The method as recited in any one of paragraphs F-K, wherein associating the object with the tracked object is further based at least in part on a determination that a detected classification of the object corresponds to a tracked classification of the tracked object.

M. The method as recited in any one of paragraphs F-L, wherein associating the object with the tracked object is further based at least in part on a determination that the location is less than a threshold distance from the estimated location.

N. The method as recited in any one of paragraphs F-M, wherein the output from the machine-learned model further includes a bounding box associated with the object, the bounding box indicative of at least one of: the location of the object in the environment relative to the vehicle; a size associated with the object; or an orientation associated with the object.

O. The method as recited in any one of paragraphs F-N, wherein the sensor data comprises at least one of: image data, lidar data, radar data, or time of flight data.

P. The method as recited in any one of paragraphs F-O, wherein the machine-learned model comprises memory that is configured to store prior information about the object.

Q. One or more non-transitory computer-readable media storing instructions that, when executed by one or more processors, cause the one or more processors to perform operations comprising: receiving, at a first time, sensor data associated with a vehicle operating in an environment; inputting the sensor data into a machine-learned model that is configured to: determine a location of an object in the environment based at least in part on the sensor data; determine an estimated location of a tracked object in the environment based at least in part on a trajectory traversed by the tracked object, the trajectory determined based at least in part on additional sensor data received by the machine-learned model prior to the first time; and associate the object with the tracked object based at least in part on the location and the estimated location; receiving, as an output from the machine-learned model, an indication of the location and the trajectory; and controlling the vehicle based at least in part on the output.

R. The one or more non-transitory computer-readable media as recited in paragraph Q, wherein the location and the estimated location are associated with the first time, and wherein the tracked object traversed the trajectory prior to the first time.

S. The one or more non-transitory computer-readable media as recited in any one of paragraphs Q-R, wherein the additional sensor data represents the object over a period of time prior to the first time.

T. The one or more non-transitory computer-readable media as recited in any one of paragraphs Q-S, wherein the machine-learned model is further configured to: based at least in part on associating the object with the tracked object, update the trajectory traversed by the tracked object such that the trajectory intersects the location; and store the updated trajectory in a memory that is accessible to the machine-learned model.

U. A system comprising: one or more processors; and one or more non-transitory computer-readable media storing instructions that, when executed by the one or more processors, cause the system to perform operations comprising: receiving sensor data comprising a first, time-ordered collection of frames representing a vehicle traversing an environment; receiving ground truth data associated with an object in the environment that is represented in the sensor data, the ground truth data comprising a second, time-ordered collection of frames indicating at least a bounding box associated with the object, a trajectory traversed by the object, and an identifier associating the bounding box with the trajectory; inputting the sensor data into a machine-learned model that is associated with the vehicle; receiving an output from the machine-learned model, the output including at least a predicted bounding box associated with the object and a predicted trajectory traversed by the object; determining a difference between the ground truth data and the output; and based at least in part on the difference meeting or exceeding a threshold difference, training the machine-learned model end-to-end such that the difference between the ground truth data and the output is minimized.

V. The system as recited in paragraph U, wherein the sensor data comprises at least one of: image data; lidar data; radar data; or time of flight data.

W. The system as recited in any one of paragraphs U-V, wherein: the machine-learned model comprises a first portion and a second portion, the first portion configured to determine the predicted bounding box, the second portion configured to determine the predicted trajectory based at least in part on the predicted bounding box; and training the machine-learned model end-to-end comprises training the first portion of the machine-learned model such that an output of the first portion is tailored for use as an input to the second portion of the machine-learned model, the output of the first portion including at least the predicted bounding box.

X. The system as recited in any one of paragraphs U-W, wherein: a first frame of the time-ordered collection of frames is indicative of a first location of the object in the environment at a current time; and a second frame of the time-ordered collection of frames is indicative of a second location of the object along the trajectory at a prior time.

Y. A method comprising: receiving sensor data associated with a vehicle traversing an environment, the sensor data representing an object in the environment over a period of time; receiving ground truth data associated with the sensor data, the ground truth data indicating at least a bounding box indicative of a location of the object in the environment; inputting the sensor data into a machine-learned model; receiving, from the machine-learned model, an output including at least a predicted bounding box indicative of a predicted location of the object in the environment; determining a difference between the location and the predicted location; and based at least in part on the difference, altering a parameter of the machine-learned model to minimize the difference.

Z. The method as recited in paragraph Y, wherein altering the parameter of the machine-learned model comprises training the machine-learned model end-to-end such that a first portion of the machine-learned model and a second portion of the machine-learned model are each trained based at least in part on the output.

AA. The method as recited in any one of paragraphs Y-Z, wherein the machine-learned model comprises a first portion and a second portion, the first portion configured to determine the predicted bounding box, the second portion configured to determine a predicted trajectory based at least in part on the predicted bounding box.

BB. The method as recited in any one of paragraphs Y-AA, wherein the difference is a first difference, the ground truth data is further indicative of a trajectory traversed by the object, and the output further includes a predicted trajectory traversed by the object, the method further comprising: determining a second difference between the trajectory and the predicted trajectory; and wherein altering the parameter of the machine-learned model is further based at least in part on the second difference.

CC. The method as recited in any one of paragraphs Y-BB, wherein the difference is a first difference, the bounding box is further indicative of an orientation of the object, and the predicted bounding box is further indicative of a predicted orientation of the object, the method further comprising: determining a second difference between the orientation of the object and the predicted orientation of the object; and wherein altering the parameter of the machine-learned model is further based at least in part on the second difference.

DD. The method as recited in any one of paragraphs Y-CC, wherein altering the parameter of the machine-learned model comprises updating a software component of the machine-learned model based at least in part on the difference.

EE. The method as recited in any one of paragraphs Y-DD, wherein the sensor data comprises at least one of: image data; lidar data; radar data; or time of flight data.

FF. The method as recited in any one of paragraphs Y-EE, wherein the object is at least one of another vehicle, a pedestrian, or a cyclist.

GG. The method as recited in any one of paragraphs Y-FF, wherein the ground truth data further includes an identifier associating a trajectory traversed by the object with the bounding box.

HH. The method as recited in any one of paragraphs Y-GG, further comprising, subsequent to altering the parameter of the machine-learned model, sending the machine-learned model to the vehicle for use in traversing the environment.

II. The method as recited in any one of paragraphs Y-HH, wherein the machine-learned model comprises: a first portion that is configured to determine the predicted bounding box, the predicted bounding box indicating a location of the object in the environment; and a second portion that is configured to: determine, based at least in part on tracking data associated with the object, an estimated location of the object in the environment; associate the predicted bounding box with the tracking data based at least in part on the location and the estimated location; and determine a predicted trajectory traversed by the object based at least in part on the location and the tracking data.

JJ. One or more non-transitory computer-readable media storing instructions that, when executed by one or more processors, cause the one or more processors to perform operations comprising: receiving sensor data associated with a vehicle traversing an environment, the sensor data representing an object in the environment over a period of time; receiving ground truth data associated with the sensor data, the ground truth data indicating at least a bounding box indicative of a location of the object in the environment; inputting the sensor data into a machine-learned model; receiving, from the machine-learned model, an output including at least a predicted bounding box indicative of a predicted location of the object in the environment; determining a difference between the location and the predicted location; and based at least in part on the difference, altering a parameter of the machine-learned model to minimize the difference.

KK. The one or more non-transitory computer-readable media as recited in paragraph JJ, wherein altering the parameter of the machine-learned model comprises training the machine-learned model end-to-end such that a first portion of the machine-learned model and a second portion of the machine-learned model are each trained based at least in part on the output.

LL. The one or more non-transitory computer-readable media as recited in any one of paragraphs JJ-KK, wherein the machine-learned model comprises a first portion and a second portion, the first portion configured to determine the predicted bounding box, the second portion configured to determine a predicted trajectory based at least in part on the predicted bounding box.

MM. The one or more non-transitory computer-readable media as recited in any one of paragraphs JJ-LL, wherein the difference is a first difference, the ground truth data is further indicative of a trajectory traversed by the object, and the output further includes a predicted trajectory traversed by the object, the method further comprising: determining a second difference between the trajectory and the predicted trajectory; and wherein altering the parameter of the machine-learned model is further based at least in part on the second difference.

NN. The one or more non-transitory computer-readable media as recited in any one of paragraphs JJ-MM, wherein altering the parameter of the machine-learned model comprises updating a software component of the machine-learned model based at least in part on the difference.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions that, when executed by the one or more processors, cause the system to perform operations comprising:
receiving sensor data comprising a first, time-ordered collection of frames representing a vehicle traversing an environment;
receiving ground truth data associated with an object in the environment that is represented in the sensor data, the ground truth data comprising a second, time-ordered collection of frames indicating at least a bounding box associated with the object, a trajectory traversed by the object, and an identifier associating the bounding box with the trajectory;
inputting the sensor data into a machine-learned model that is associated with the vehicle;
receiving an output from the machine-learned model, the output including at least a predicted bounding box associated with the object and a predicted trajectory traversed by the object;
determining a difference between the ground truth data and the output; and
based at least in part on the difference meeting or exceeding a threshold difference, training the machine-learned model end-to-end such that the difference between the ground truth data and the output is minimized.

2. The system of claim 1, wherein the sensor data comprises at least one of:
image data;
lidar data;
radar data; or
time of flight data.

3. The system of claim 1, wherein:
the machine-learned model comprises a first portion and a second portion, the first portion configured to determine the predicted bounding box, the second portion configured to determine the predicted trajectory based at least in part on the predicted bounding box; and
training the machine-learned model end-to-end comprises training the first portion of the machine-learned model such that an output of the first portion is tailored for use as an input to the second portion of the machine-learned model, the output of the first portion including at least the predicted bounding box.

4. The system of claim 1, wherein:
a first frame of the time-ordered collection of frames is indicative of a first location of the object in the environment at a current time; and a second frame of the time-ordered collection of frames is indicative of a second location of the object along the trajectory at a prior time.

5. A method comprising:
receiving sensor data associated with a vehicle traversing an environment, the sensor data representing an object in the environment over a period of time;
receiving ground truth data associated with the sensor data, the ground truth data indicating at least a bounding box indicative of a location of the object in the environment;
inputting the sensor data into a machine-learned model;
receiving, from the machine-learned model, an output including at least a predicted bounding box indicative of a predicted location of the object in the environment;
determining a difference between the location and the predicted location; and
based at least in part on the difference, altering a parameter of the machine-learned model to minimize the difference.

6. The method of claim 5, wherein altering the parameter of the machine-learned model comprises training the machine-learned model end-to-end such that a first portion of the machine-learned model and a second portion of the machine-learned model are each trained based at least in part on the output.

7. The method of claim 5, wherein the machine-learned model comprises a first portion and a second portion, the first portion configured to determine the predicted bounding box, the second portion configured to determine a predicted trajectory based at least in part on the predicted bounding box.

8. The method of claim 5, wherein the difference is a first difference, the ground truth data is further indicative of a trajectory traversed by the object, and the output further includes a predicted trajectory traversed by the object, the method further comprising:
determining a second difference between the trajectory and the predicted trajectory; and
wherein altering the parameter of the machine-learned model is further based at least in part on the second difference.

9. The method of claim 5, wherein the difference is a first difference, the bounding box is further indicative of an orientation of the object, and the predicted bounding box is further indicative of a predicted orientation of the object, the method further comprising:
determining a second difference between the orientation of the object and the predicted orientation of the object; and
wherein altering the parameter of the machine-learned model is further based at least in part on the second difference.

10. The method of claim 5, wherein altering the parameter of the machine-learned model comprises updating a software component of the machine-learned model based at least in part on the difference.

11. The method of claim 5, wherein the sensor data comprises at least one of:
image data;
lidar data;
radar data; or
time of flight data.

12. The method of claim 5, wherein the object is at least one of another vehicle, a pedestrian, or a cyclist.

13. The method of claim 5, wherein the ground truth data further includes an identifier associating a trajectory traversed by the object with the bounding box.

14. The method of claim 5, further comprising, subsequent to altering the parameter of the machine-learned model, sending the machine-learned model to the vehicle for use in traversing the environment.

15. The method of claim 5, wherein the machine-learned model comprises:
a first portion that is configured to determine the predicted bounding box, the predicted bounding box indicating a location of the object in the environment; and
a second portion that is configured to:
determine, based at least in part on tracking data associated with the object, an estimated location of the object in the environment;
associate the predicted bounding box with the tracking data based at least in part on the location and the estimated location; and
determine a predicted trajectory traversed by the object based at least in part on the location and the tracking data.

16. One or more non-transitory computer-readable media storing instructions that, when executed by one or more processors, cause the one or more processors to perform operations comprising:
receiving sensor data associated with a vehicle traversing an environment, the sensor data representing an object in the environment over a period of time;
receiving ground truth data associated with the sensor data, the ground truth data indicating at least a bounding box indicative of a location of the object in the environment;
inputting the sensor data into a machine-learned model;
receiving, from the machine-learned model, an output including at least a predicted bounding box indicative of a predicted location of the object in the environment;
determining a difference between the location and the predicted location; and
based at least in part on the difference, altering a parameter of the machine-learned model to minimize the difference.

17. The one or more non-transitory computer-readable media of claim 16, wherein altering the parameter of the machine-learned model comprises training the machine-learned model end-to-end such that a first portion of the machine-learned model and a second portion of the machine-learned model are each trained based at least in part on the output.

18. The one or more non-transitory computer-readable media of claim 16, wherein the machine-learned model comprises a first portion and a second portion, the first portion configured to determine the predicted bounding box, the second portion configured to determine a predicted trajectory based at least in part on the predicted bounding box.

19. The one or more non-transitory computer-readable media of claim 16, wherein the difference is a first difference, the ground truth data is further indicative of a trajectory traversed by the object, and the output further includes a predicted trajectory traversed by the object, the method further comprising:
determining a second difference between the trajectory and the predicted trajectory; and
wherein altering the parameter of the machine-learned model is further based at least in part on the second difference.

20. The one or more non-transitory computer-readable media of claim 16, wherein altering the parameter of the machine-learned model comprises updating a software component of the machine-learned model based at least in part on the difference.

\* \* \* \* \*